W. B. MATHEWS.
Tether.
No. 200,620. Patented Feb. 26, 1878.
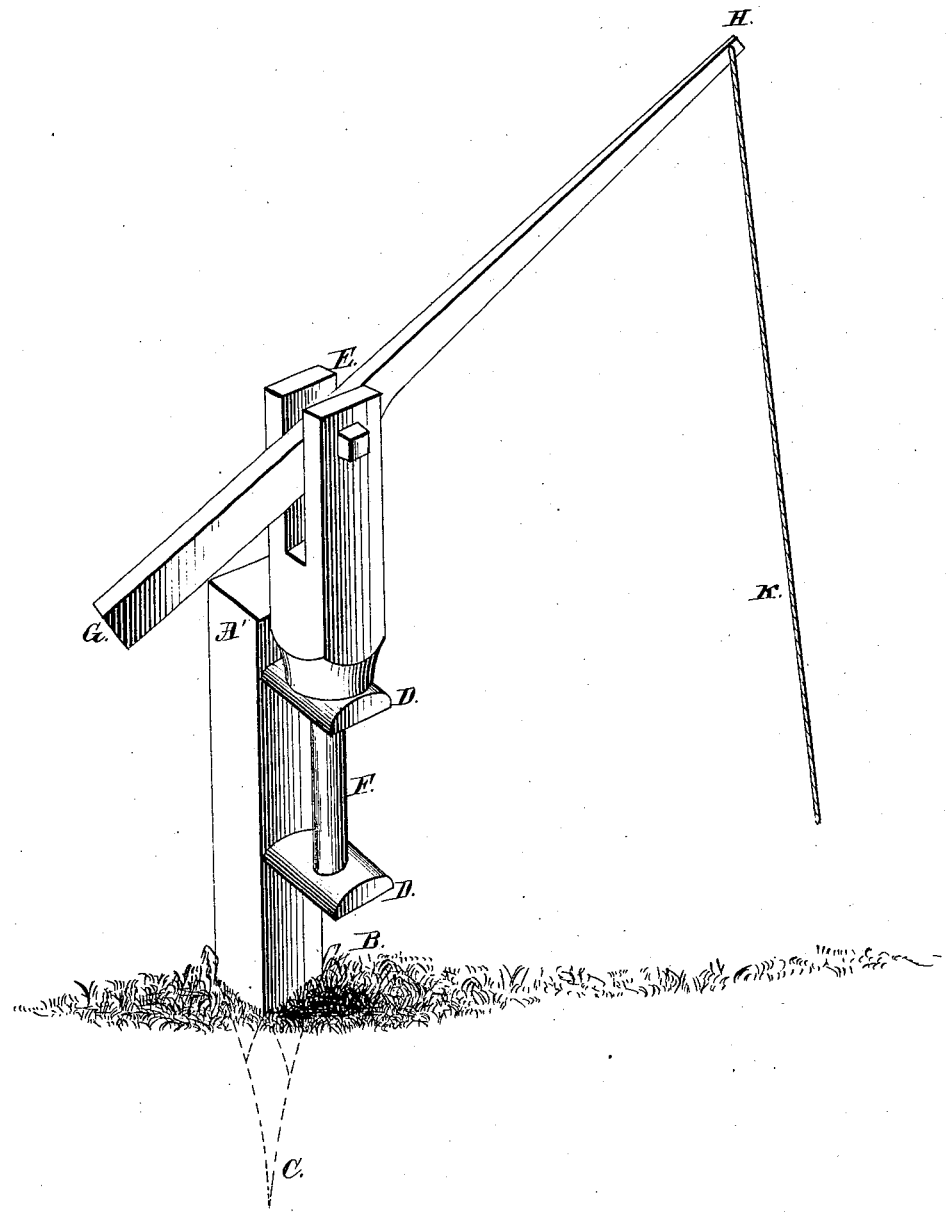
Attest:
Osceola Evans
William F. Caldwell
Inventor:
William B. Mathews.

UNITED STATES PATENT OFFICE.

WILLIAM B. MATHEWS, OF DELTA, ALABAMA.

IMPROVEMENT IN TETHERS.

Specification forming part of Letters Patent No. 200,620, dated February 26, 1878; application filed June 20, 1877.

*To all whom it may concern:*

Be it known that I, WM. B. MATHEWS, of Delta, Clay county, and State of Alabama, have invented certain new and useful Improvements in that class of devices known as "Tethers" or "Stock-Grazers," of which the following is a full, clear, and exact description, reference being had to the accompanying drawing, and to the letters of reference marked thereon, which drawing illustrates, in perspective, the device as completed in accordance with my improvements and ready for use.

The object of my invention is to produce an implement for tethering stock while grazing, which implement shall be capable of being easily and quickly constructed, adapted to be mounted upon any ordinary post, and by use of which the stock will not be liable to become entangled with the leading-rope.

To accomplish this the invention consists in certain details of construction and novel assemblages of parts, as will be hereinafter first fully described, and then pointed out in the claim.

A' is a stationary post, pointed, as at C, and driven down sufficiently below the ground-line B. D D are the brackets which support the forked upright E. They are properly shouldered, and driven into auger-holes in the side of post A', and at suitable distances from each other. The upright E is also shouldered and rests upon the upper bracket D, the cylindrical portion F passing through said upper bracket, and being guided by the lower bracket, which is also perforated. The leading-pole G is pivoted in the forked upright E, and sustains the rope or chain K at the outer end H. The pole, being properly balanced, tends to keep rope K out of the way of the tethered stock.

By use of the brackets, as explained, the implement may be readily attached to any convenient post, and they may be quickly made by an ordinary workman, using only the ax and auger.

I am aware of previously-existing tethers wherein the revolving upright is sustained in a socket made in the upper end of the stationary post. This form is objectionable in this, that the post so perforated is liable to split under the straining action of the tethered stock unless banded with iron at the top, which adds materially to the expense of construction, and practically prevents its use. The necessary perforation in the direction of the length of the post is, moreover, exceedingly hard to make, especially with the ordinary tools.

I am also aware of device shown in patent to Newton, August 27, 1867, wherein the leading-pole is sustained by a block, which revolves upon a horizontal axis projecting laterally from the turning cap or collar. This construction necessitates the employment of a metallic collar with a metallic axis for the leading-pole, whereas the principal object of my improvement is to do away with all castings and metallic fittings, and to so adapt the different elements of the machine that they may be made by any ordinary workman, and be put up with very little delay or expense.

To these forms of tether I desire it understood that I lay no claim; but,

Having now fully described my invention, what I do claim as new, and desire to secure by Letters Patent, is—

In an implement for tethering stock, the combination, with stationary post A', of the perforated brackets D D, secured to the side thereof, and supporting the revolving forked upright E F, and the balanced leading-pole G, pivoted in said upright, the whole being arranged as shown and described.

WILLIAM B. MATHEWS.

Witnesses:
OSCEOLA EVANS,
WILLIAM F. CALDWELL.